(12) United States Patent
Ren

(10) Patent No.: US 11,988,754 B2
(45) Date of Patent: May 21, 2024

(54) CLOCK OFFSET DETERMINATION METHOD AND APPARATUS

(71) Applicant: DATANG MOBILE COMMUNICATIONS EQUIPMENT CO., LTD., Beijing (CN)

(72) Inventor: Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 214 days.

(21) Appl. No.: 17/773,845

(22) PCT Filed: Nov. 3, 2020

(86) PCT No.: PCT/CN2020/126222
§ 371 (c)(1),
(2) Date: May 3, 2022

(87) PCT Pub. No.: WO2021/093642
PCT Pub. Date: May 20, 2021

(65) Prior Publication Data
US 2022/0381922 A1 Dec. 1, 2022

(30) Foreign Application Priority Data
Nov. 11, 2019 (CN) .............................. 201911096940

(51) Int. Cl.
*G01S 19/25* (2010.01)
*G01S 19/31* (2010.01)

(52) U.S. Cl.
CPC .......... *G01S 19/256* (2013.01); *G01S 19/252* (2013.01); *G01S 19/31* (2013.01)

(58) Field of Classification Search
CPC ............ G01C 21/3638; G01C 21/3602; G01C 21/3647; G01C 21/365; G02B 27/0179; G06N 20/00
See application file for complete search history.

(56) References Cited

U.S. PATENT DOCUMENTS

| 2002/0019239 A1* | 2/2002 | Kasapidis ............. H04W 64/00 455/456.5 |
| 2002/0033767 A1* | 3/2002 | Krasner .................. G01S 19/09 342/357.62 |

(Continued)

FOREIGN PATENT DOCUMENTS

| CN | 103906228 A | 7/2014 |
| CN | 106658707 A | 5/2017 |

(Continued)

OTHER PUBLICATIONS

Buehrer R. Michael et al., "Collaborative Sensor Network Localization: Algorithms and Practical Issues", Proceedings off the IEEE, IEEE, New York, US, vol. 106, No. 6, Jun. 2018, total 26 pages.

(Continued)

*Primary Examiner* — Seth A Silverman
(74) *Attorney, Agent, or Firm* — Kilpatrick Townsend & Stockton LLP

(57) ABSTRACT

Disclosed are a clock offset determination method and apparatus. The clock offset determination method provided in the embodiment of the present application includes: determining, by measuring downlink positioning reference signals (PRS) from a reference base station and a non-reference base station, a first positioning measurement value; determining, on the basis of the first positioning measurement value, a first clock offset between the reference base station and the non-reference base station; and on the basis of the first clock offset, assisting a target terminal to obtain a second clock offset.

20 Claims, 6 Drawing Sheets

(56) References Cited

U.S. PATENT DOCUMENTS

| | | | |
|---|---|---|---|
| 2004/0092275 A1* | 5/2004 | Krasner | H04B 7/2693 |
| | | | 455/456.1 |
| 2004/0203865 A1* | 10/2004 | Krasner | H04B 7/2675 |
| | | | 455/456.1 |
| 2010/0164789 A1 | 7/2010 | Basnayake | |
| 2012/0270561 A1* | 10/2012 | Giustina | H04W 24/02 |
| | | | 455/456.1 |
| 2016/0234795 A1 | 8/2016 | Ekstedt et al. | |
| 2017/0212206 A1 | 7/2017 | Kim et al. | |
| 2018/0217224 A1 | 8/2018 | Jain et al. | |
| 2019/0069260 A1 | 2/2019 | Chae et al. | |

FOREIGN PATENT DOCUMENTS

| | | |
|---|---|---|
| CN | 108112071 A | 6/2018 |
| CN | 108370551 A | 8/2018 |
| CN | 109479255 A | 3/2019 |
| CN | 109842934 A | 6/2019 |
| JP | 2019531483 A | 10/2019 |

OTHER PUBLICATIONS

Del Peral-Rosado Jose A et al., "Impact of Frequency-Hopping NB-IoT Positioning in 4G and Future 5G Networks", 2017 IEEE international conference on communications workshop(ICC workshops), IEEE, May 21, 2017, total 6 pages.

CATT, "NR RAT-dependent DL Positioning", 3GPP TSG RAN WG1 Ad-Hoc Meeting 1901, Taipei, 21 st—Jan. 25, 2019, total 19 pages, R1-1900310.

CATT, "Further discussion of NR RAT-dependent DL Positioning", 3GPP TSG RAN WG1 Meeting#96, Athens, Greece, Feb. 25-Mar. 1, 2019, total 31 pages, R1-1901980.

3GPP TS 38.305 V15.4.0, 3rd Generation Partnership Project; Technical Specification Group Radio Access Network; NG Radio Access Network (NG-RAN); Stage 2 functional specification of User Equipment (UE) positioning in NG-RAN (Release 15), total 72 pages, Jun. 2019.

Intel Corporation, "Remaining Details of Physical Layer Measurements for NR Positioning", 3GPP TSG RAN WG1 Meeting #98bis, Chongqing, China, Oct. 14-20, 2019, total 21 pages, R1-1910676.

CATT, "Discussion of the Scope of Rel-17 NR Positioning Enhancements", 3GPP TSG RAN WG Meeting #85, Newport Beach, USA, Sep. 16-20, 2019, total 11 pages, RP-191978.

* cited by examiner

CLOCK OFFSET DETERMINATION METHOD AND APPARATUS

CROSS REFERENCE TO RELATED APPLICATIONS

The present application is a US National Stage of International Application No. PCT/CN2020/126222, filed on Nov. 3, 2020, which claims priority to the Chinese Patent Application No. 201911096940.4, filed to the China Patent Office on Nov. 11, 2019 and entitled "CLOCK OFFSET DETERMINATION METHOD AND APPARATUS", the entire contents of which are incorporated herein by reference.

FIELD

The present application relates to the field of communication, in particular to a clock offset determination method and apparatus.

BACKGROUND

A 3rd generation partnership project (3GPP) defines various user terminal (user equipment, UE) positioning methods by measuring a positioning reference signal (PRS) itself of a 3GPP wireless communication system, for example, a downlink observed time difference of arrival (OTDOA), an uplink time difference of arrival (UTDOA), etc. These methods have a feature of positioning based on the PRS itself of the wireless communication system and can work in an environment without receiving a non-cellular network positioning reference signal. However, these positioning methods have a common problem of low positioning accuracy.

SUMMARY

Embodiments of the present application provide a clock offset determination method and apparatus, used to reduce the clock offset between base stations, to improve positioning accuracy.

At a first terminal side, a clock offset determination method provided by an embodiment of the present application includes: determining, by measuring downlink PRSs from a reference base station and a non-reference base station, a first positioning measurement value; determining, based on the first positioning measurement value, a first clock offset between the reference base station and the non-reference base station; and assisting, based on the first clock offset, a target terminal to obtain a second clock offset.

In one embodiment, the assisting, based on the first clock offset, the target terminal to obtain the second clock offset is specifically in one of the following modes: mode 1, the first clock offset is directly used as the second clock offset, and the target terminal is notified via a Sidelink interface; mode 2, the first clock offset is fed back to a first terminal of a first type via the sidelink interface, the second clock offset is determined by the first terminal of the first type based on the first clock offset and a predefined criterion, and is notified to the target terminal via the Sidelink interface; and mode 3, the target terminal is notified of the first clock offset via the Sidelink interface, and the second clock offset is determined by the target terminal based on the first clock offset and the predefined criterion.

In one embodiment, the predefined criterion includes one or a combination of the following calculating criteria: an arithmetic mean, selection of the first clock offset with an optimal channel condition value or a weighted mean.

In one embodiment, the PRSs include one or a combination of the following signals: a new radio (NR) PRS, a NR carrier phase positioning reference signal (C-PRS), a synchronizing signal block (SSB) or a channel state indication reference signal (CSI-RS).

Correspondingly, at a second terminal side, a clock offset determination method provided by an embodiment of the present application includes: determining a second clock offset, where the second clock offset is determined based on a first clock offset between a reference base station and a non-reference base station, and the first clock offset is determined based on a first positioning measurement value which is determined by a first terminal by measuring downlink PRSs from the reference base station and the non-reference base station; and modifying the first positioning measurement value based on the second clock offset to obtain a second positioning measurement value.

In one embodiment, the method further includes: performing downlink positioning based on the second positioning measurement value.

In one embodiment, the second clock offset is determined by one of the following modes: mode 1, the first clock offset notified by the first terminal is received via a Sidelink interface, and the first clock offset is used as the second clock offset; mode 2, the second clock offset notified by the first terminal of a first type is received via the Sidelink interface, the second clock offset is determined by the first terminal of the first type based on the first clock offset and a predefined criterion, and the first clock offset is determined by the first terminal of a second type and fed back to the first terminal of the first type via the Sidelink interface; and mode 3, first clock offsets notified by a plurality of first terminals are received via the Sidelink interface, and the second clock offset is determined based on the first clock offsets and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

Corresponding to the above method, at the first terminal side, a terminal provided by an embodiment of the present application includes a processor and a memory, where the processor is configured to read a program in the memory and execute: determining, by measuring downlink PRSs from a reference base station and a non-reference base station, a first positioning measurement value; determining, based on the first positioning measurement value, a first clock offset between the reference base station and the non-reference base station; and assisting, based on the first clock offset, a target terminal to obtain a second clock offset.

In one embodiment, the processor is configured to assist the target terminal to obtain the second clock offset in one of the following modes based on the first clock offset: mode 1, the first clock offset is directly used as the second clock offset, and the target terminal is notified via the Sidelink interface; mode 2, the first clock offset is fed back to the first terminal of the first type via the Sidelink interface, the second clock offset is determined by the first terminal of the first type based on the first clock offset and a predefined criterion, and is notified to the target terminal via the Sidelink interface; and mode 3, the target terminal is notified of the first clock offset via the Sidelink interface, and the second clock offset is determined by the target terminal based on the first clock offset and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

At a second terminal side, a terminal provided by an embodiment of the present application includes a processor and a memory, where the processor is configured to read a program in the memory and execute: determining a second clock offset, where the second clock offset is determined based on a first clock offset between a reference base station and a non-reference base station, and the first clock offset is determined based on a first positioning measurement value which is determined by a first terminal by measuring downlink PRSs from the reference base station and the non-reference base station; and modifying the first positioning measurement value based on the second clock offset to obtain a second positioning measurement value.

In one embodiment, the processor is further configured to: perform downlink positioning based on the second positioning measurement value.

In one embodiment, the processor is configured to determine the second clock offset in one of the following modes: mode 1, the first clock offset notified by the first terminal is received via a Sidelink interface, and the first clock offset is used as the second clock offset; mode 2, the second clock offset notified by the first terminal of a first type is received via the Sidelink interface, the second clock offset is determined by the first terminal of the first type based on the first clock offset and a predefined criterion, and the first clock offset is determined by the first terminal of a second type and fed back to the first terminal of the first type via the Sidelink interface; and mode 3, first clock offsets notified by a plurality of first terminals are received via the Sidelink interface, and the second clock offset is determined based on the first clock offsets and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

At a first terminal side, a clock offset determination apparatus provided by an embodiment of the present application includes: a first device, configured to determine a first positioning measurement value by measuring downlink PRSs from a reference base station and a non-reference base station; and a second device, configured to determine a first clock offset between the reference base station and the non-reference base station based on the first positioning measurement value; and assist a target terminal to obtain a second clock offset based on the first clock offset.

At a second terminal side, a clock offset determination apparatus provided by an embodiment of the present application includes: a third device, configured to determine a second clock offset, where the second clock offset is determined based on a first clock offset between a reference base station and a non-reference base station, and the first clock offset is determined based on a first positioning measurement value which is determined by a first terminal by measuring downlink PRSs from the reference base station and the non-reference base station; and a fourth device, configured to modify the first positioning measurement value based on the second clock offset to obtain a second positioning measurement value.

Another embodiment of the present application provides a computer storage medium. The computer storage medium stores a computer executable instruction which is configured to make a computer execute any above method.

According to the embodiments of the present application, the first positioning measurement value is determined by measuring the downlink PRSs from the reference base station and the non-reference base station; the first clock offset between the reference base station and the non-reference base station is determined based on the first positioning measurement value; and based on the first clock offset, a target terminal is assisted to obtain a second clock offset, and a calibration solution of the clock offset between the base stations is realized, the clock offset between the base stations can be reduced, and the positioning accuracy is improved.

BRIEF DESCRIPTION OF THE DRAWINGS

In order to describe the embodiments of the present application more clearly, accompanying drawings needed in description of the embodiments will be briefly introduced below. Apparently, the drawings in the following description are only some embodiments of the present application.

DETAILED DESCRIPTION OF THE EMBODIMENTS

Figure 1:
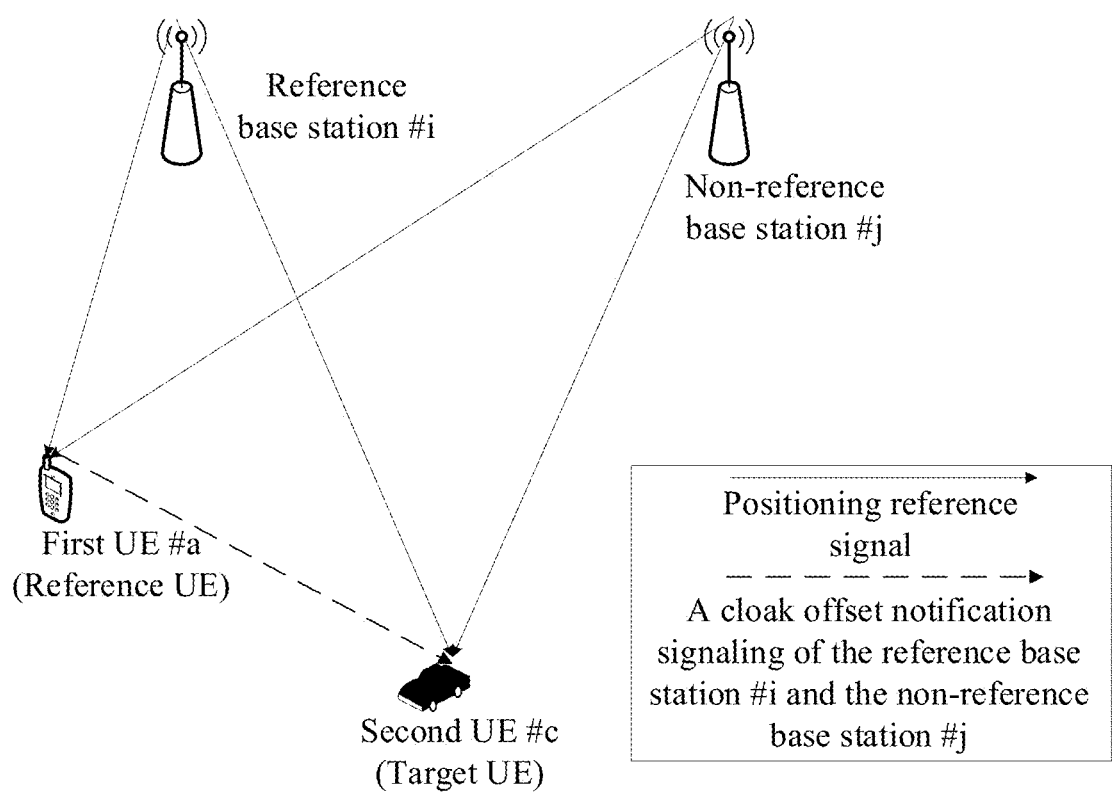
FIG. 1 is a first schematic diagram of determining a second clock offset based on a first clock offset provided by embodiments of the present application.

The embodiments of the present application will be described clearly and completely below with reference to the drawings in the embodiments of the present application. Apparently, the described embodiments are only some, but not all, of the embodiments of the present application.

It needs to be noted that a PRS in the embodiments of the present application indicates all reference signals may be used for measuring time of arrival (TOA), for example, the PRS includes a PRS may be used for traditional OTDOA/UTDOA positioning, a channel state indication reference signal (CSI-RS), a sounding reference signal (SRS), etc.

A method (a UE positioning method having a feature of high positioning accuracy) for positioning by using a carrier phase measurement value may have several basic modes below:

a non-differential mode: a UE location is calculated by directly using the carrier phase measurement value without using a differential technology; and a differential mode: firstly, differential is performed on the carrier phase measurement value, some common offsets in the measurement value are eliminated, and then the UE location is calculated by using the carrier phase measurement value after differential. The differential mode has two types of single differential and double differential.

A single differential mode: a sending end (or receiving end) is selected as a reference terminal, and then differential is performed on a measurement value related to other sending ends (or receiving ends) and a measurement value related to the reference terminal. Single differential aims to eliminate a measurement offset of an end (a receiving end or sending end).

The double differential mode: differential is performed again on the measurement value after the single differential mode to eliminate measurement errors related to the sending end and the receiving end, for example, a clock offset of a base station (BS) and UE. For example, the double differential technology can be used for a scene of downlink positioning. At the moment, there are a plurality of sending ends (base stations) and two receiving ends, and one of the receiving ends is a reference receiving end, whose location is known. The other receiving end is UE, whose location is unknown. At the moment, the two receiving ends receive a positioning signal sent by the base station at the same time; the double differential technology is used to eliminate a common error, related to the sending ends and the receiving ends, in measurement values of the two receiving ends; and then a location of a receiving end whose location is unknown is calculated accurately. By adopting the double differential mode, influence on positioning accuracy due to time and frequency synchronism offset between the base stations may be eliminated.

To sum up, the non-differential mode is affected by the clock offsets of the UE and the base stations at the same time, a clock offset of the UE is far larger than a clock offset of the base station, and the double differential mode requires to specially mount a reference receiving end in a known location, which brings a negative effect on specific system realizing. The single differential mode may be used for a reference signal time difference (RSTD) measurement value of 3GPP OTDOA positioning (the RSTD measurement value calculation method is that: differential calculation is performed on a TOA measurement value related to target UE and all BSs and a TOA measurement value related to the UE and a reference BS). The single differential mode can eliminate influence of the clock offset of the UE on positioning, however, the clock offset between the base stations will directly affect the positioning accuracy of the single differential mode.

Therefore, as for the single differential mode, time synchronism offset between the base stations is a key of directly affecting the positioning accuracy of the single differential mode. Besides, a time synchronization method between the base stations is monitoring a PRS of one base station adjacent to a base station by the certain base station. Then, a time offset between the two base stations is estimated based on a detected time of arrival of the PRS, sending time of the PRS and a known distance between the two base stations. The estimated time offset between the two base stations may be used for compensating an influence of the time offset between the base stations on an OTDOA or UTDOA positioning algorithm. Effectiveness of the method is limited as follow: estimation accuracy of estimated time offset between the two base stations based on a PRS sent once is limited; and as the base stations need to receive PRS signals of the other base stations, resource cost of the PRS is increased, and realizing complexity of the base stations is increased. However, as for a UE-assisted positioning embodiments based on location management function (LMF) entity processing, as all measurement values are reported to LMF for processing via the UE, the solution will cause large time delay.

Therefore, embodiments of the present application provide a clock offset calibration method and apparatus based on carrier phase and UE-based positioning, and for the UE-assisted positioning solution, time delay will be reduced effectively.

The method and the apparatus are based on the same application conception, and principles of solving problems of the method and the apparatus are similar, so implementations of the apparatus and the method may refer to each other, and repetitions are not described in detail.

The embodiments of the present application may be suitable for various systems, especially, a fifth generation (5G) system. For example, a suitable system may be a global system of mobile (GSM) communication system, a code division multiple access (CDMA) system, a wideband code division multiple access (WCDMA) general packet radio service (GPRS) system, a long term evolution (LTE) system, an LTE frequency division duplex (FDD) system, LTE time division duplex (TDD), a universal mobile telecommunication system (UMTS), a worldwide interoperability for microwave access (WiMAX) system, the 5G system and a 5G NR system, etc. The various systems each include a terminal device and a network device.

The terminal device involved in the embodiments of the present application may refer to a device for providing voice and/or data connectivity, a hand-held device with a wireless connection function, or other processing devices connected to a wireless modem. In different systems, names of the terminal device may be different, for example, in the 5G system, the terminal device may be called user equipment (UE). A wireless terminal device may communicate with one or a plurality of core networks via a radio access network (RAN), the wireless terminal device may be a mobile terminal device, such as a mobile phone (or called "cellular" phone) and a computer with the mobile terminal device, for example, may be a portable, pocket, hand-held, computer built-in or vehicle-mounted mobile apparatus, which exchange language and/or data with a radio access network. For example, there are a personal communication service (PCS) phone, a cordless telephone, a session initiated protocol (SIP) phone, a wireless local loop (WLL) station, a personal digital assistant (PDA) and other devices. The wireless terminal device may be also called a system, a subscriber device, a subscriber station, a mobile station, a mobile, a remote station, an access point, a remote terminal, an access terminal, a user terminal, a user agent or a user device, which is not limited in the embodiments of the present application.

The network device involved in the embodiments of the present application may be a base station, and the base station may include a plurality of cells. According to difference of specific application occasions, the base station may be also called an access point, or may refer to a device which communicates with the wireless terminal device via one or a plurality of sectors on an air interface in an access network, or may be called other names. The network device can be used for interconversion of a received air frame and an internet protocol (IP) grouping and serves as a router between the wireless terminal device and other parts of the access network, where the other parts of the access network may include an IP communication network. The network device may also coordinate attribute management of the air interface. For example, the network device involved in the embodiments of the present application may be a network device (a base transceiver station (BTS)) in a global system for mobile communications or a code division multiple access (CDMA), or a network device (NodeB) in a wideband code division multiple access (WCDMA), or an evolutional network device (evolutional Node B, eNB or e-NodeB) in an LTE system, a 5G base station in a 5G network architecture (next generation system), or a home evolved Node B (HeNB), a relay node, a home base station (Femto e-NodeB), a pico cell, etc., which is not limited in the embodiments of the present application.

Embodiments of the present application are described in detail below with reference to the drawings of the specification. It needs to be noted that a show sequence of the embodiments of the present application only represents a sequential order of the embodiments.

In a user terminal positioning system of wireless communication, a clock offset (namely, a time synchronization error) between base stations is one of key problems which directly affect positioning performance. Embodiments of the present application provide a clock offset calibration solution based on a carrier phase. Specific introduction is as follows.

In one embodiment, the single or a plurality of first UEs (namely, reference UEs) simultaneously measure downlink PRSs from a reference base station and a non-reference base station to obtain a first positioning measurement value (namely, a carrier phase measurement value), and furthermore, a first clock offset between the reference base station and the non-reference base station is worked out based on the first positioning measurement value.

It needs to be noted that in a carrier phase positioning embodiments based on a single differential, the UE needs to measure a carrier phase difference from downlink reference signals of two base stations to the UE to obtain a single differential carrier phase measurement value, more than two single differential carrier phase measurement value hyperbolic equations are established, and a point of intersection of two hyperbolas is solved to serve as a UE location to-be-solved. A common base station in a plurality of hyperbolic equations is called the reference base station, and the other base stations are called the non-reference base station. Target UE is UE whose geographical location is unknown and needs to be calculated. Reference UE is UE whose geographical location is known and which is configured to measure and determine the clock offset between the reference base station and the non-reference base station.

Then the first UE (namely, the reference UE) assists the target UE to obtain a second clock offset by using one of the following three modes:

mode 1, the single first UE directly uses the first clock offset as the second clock offset, and notifies second UE (namely, the target UE) via a Sidelink interface;

mode 2, a plurality of first UEs of a second type (Type 2) (namely, the reference UEs of the second type) feed the first clock offsets back to the first UE of a first type (Type 1) (namely, reference UE of the first type) via the Sidelink interface, the second clock offset is determined by the first UE of Type 1 based on the first clock offsets and the predefined criterion, and then the first UE of Type 1 notifies the second UE (namely, the target UE) of the second clock offset via the Sidelink interface; and mode 3, a plurality of first UEs notify the second UE (namely, the target UE) of the first clock offsets via the Sidelink interface, and the second clock offset is determined by the second UE based on the first clock offsets and the predefined criterion.

Then the second UE modifies the first positioning measurement value based on the second clock offset to obtain a second positioning measurement value.

Finally, the second UE performs downlink positioning (a positioning solution based on the carrier phase) based on the second positioning measurement value.

The first UE (namely, the reference UE) may be the common UE, the special UE for positioning, or a road test device.

In the above mode 2, the first UE contains two types: the first UE of the first type (namely, the reference UE of the first type) and the first UE of the second type (namely, the reference UE of the second type), where the first UE of the first type is the reference UE whose geographical location is known and which is configured to measure and determine the second clock offset, and the first UE of the second type is the reference UE whose geographical location is known and which is configured to measure and obtain the first clock offset.

The PRS may be any downlink signal and include but is not limited to: a new radio (NR) PRS, an NR carrier phase positioning reference signal (C-PRS), a synchronization signal block (SSB) and a channel state indication reference signal (CSI-RS), etc.

The predefined criterion includes but is not limited to an arithmetic mean, selection of the first clock offset with an optimal channel condition value, or a weighted mean.

Specific embodiments of three solutions are introduced respectively below specific to the three modes of the first UE assisting the second UE to obtain the second clock offset.

Solution 1: a clock offset calibration solution for UE-based positioning with single reference UE.

In the solution 1, the first UE assists the second UE to obtain the second clock offset by using the mode 1.

In one embodiment, the single first UE (namely, the reference UE) simultaneously measures the downlink PRSs from the reference base station and the non-reference base station to obtain the first positioning measurement value (namely, the carrier phase measurement value), and further calculates to obtain the first clock offset between the reference base station and the non-reference base station.

Then the first UE assists the target UE to obtain the second clock offset by using the mode 1: the single first UE directly uses the first clock offset as the second clock offset, and notifies the target UE via the Sidelink interface.

Then the second UE modifies the first positioning measurement value based on the second clock offset to obtain the second positioning measurement value.

Finally, the second UE performs downlink positioning (the positioning solution based on the carrier phase) based on the modified second positioning measurement value.

The first UE (namely, the reference UE) may be the common UE, or the special UE for positioning, or a road test device.

The PRS may be any downlink signal and include but is not limited to: a NR PRS, a NR C-PRS, a SSB, a CSI-RS, etc.

The predefined criterion includes but is not limited to an arithmetic mean, selection of the first clock offset with an optimal channel condition value and a weighted mean.

As shown in FIG. 1, the base station i is the reference base station, and the base station j is the non-reference base station. The first UE a is the special reference UE for positioning and measurement, and the second UE c is the target UE.

Processing solutions of the first UE, the second UE, the reference base station and the non-reference base station are introduced respectively below.

A clock offset determination method of the first UE (the reference UE) includes the following: step 1: the first UE receives configuration signaling of a first downlink PRS; where the first downlink PRS may be any downlink signal and includes but is not limited to a NR PRS, a NR C-PRS, a SSB and a CSI-RS; and the configuration signaling may be positioning dedicated signaling from LMF, or broadcast signaling, exclusive RRC signaling of the UE or DCI signaling from a serving base station; step 2: at a moment T1, the first UE (namely, the reference UE) receives and measures first downlink PRSs of the reference base station and the non-reference base station to obtain the first clock offset between the reference base station and the non-reference base station; and step 3: the first UE notifies the target UE of the first clock offset. Where the first UE may notify the second UE (namely, the target UE) of the first clock offset via the Sidelink interface, or forward it to the second UE (the target UE) via the serving base station.

A clock offset determination method of the second UE (the target UE) includes the following: step 1: the second UE receives configuration signaling of a second downlink PRS and location information of a reference base station and a non-reference base station; where the second downlink PRS may be any downlink signal and includes but is not limited to a NR PRS, a NR C-PRS, a SSB and a CSI-RS; and the configuration signaling may be positioning dedicated signaling from LMF, or broadcast signaling, exclusive RRC of the UE signaling or DCI signaling from a serving base station; step 2: at a moment T2, the second UE receives and measures second downlink PRSs of the reference base station and the non-reference base station to obtain a first positioning measurement value (namely, a carrier phase measurement value); step 3: the second UE receives a second clock offset fed back by the first UE; step 4: the second UE modifies the first positioning measurement value (namely, the carrier phase measurement value) measured in step 2 based on the second clock offset to obtain a second positioning measurement value; and step 5: the second UE performs downlink positioning based on the second positioning measurement value, for example: a positioning solution based on a carrier phase may be adopted.

Correspondingly, a processing process at the reference base station side and the non-reference base station side includes the following: step 1: the reference base station and the non-reference base station receive configuration signaling of the first downlink PRS and the second downlink PRS, where the configuration signaling is positioning dedicated signaling from LMF; step 2: the reference base station and the non-reference base station send the first downlink PRSs to all first UEs; and step 3: the reference base station and the non-reference base station send the second downlink PRSs to all second UEs.

Solution 2: a clock offset calibration solution for UE-based positioning with a plurality of reference UEs and the first type of reference UE notifying the clock offset to the target UE.

In solution 2, the first UE assists the second UE to obtain the second clock offset by using the mode 2, and the first UE contains two types: the first UE of Type 1 (namely, the reference UE of the first type) and the first UE of Type 2 (namely, the reference UE of the second type).

In one embodiment, all first UEs (namely, the reference UEs) simultaneously measure the downlink PRSs from the reference base station and the non-reference base station to obtain the first positioning measurement value (namely, the carrier phase measurement value), and further calculate to obtain the first clock offset between the reference base station and the non-reference base station.

Then the first UE assists the target UE to obtain the second clock offset by using the mode 2: a plurality of first UEs of Type 2 (namely, the reference UEs of the second type) feed the first clock offsets back to the first UE of Type 1 (namely, the reference UE of the first type) via the Sidelink interface, the second clock offset is determined by the first UE of Type 1 based on the first clock offsets and the predefined criterion, and then the first UE of Type 1 notifies the second UE (namely, the target UE) of the second clock offset via the Sidelink interface.

Then the second UE modifies the first positioning measurement value based on the second clock offset to obtain a second positioning measurement value.

Finally, the second UE performs downlink positioning (a positioning solution based on a carrier phase) based on the second positioning measurement value.

The first UE (namely, the reference UE) may be the common UE, or the special UE for positioning, or a road test device; the PRS may be any downlink signal and includes but is not limited to: a NR PRS, a NR C-PRS, a SSB, a CSI-RS, etc.; and the predefined criterion includes but is not limited to an arithmetic mean, selection of the first clock offset with an optimal channel condition value and a weighted mean.

Figure 2:
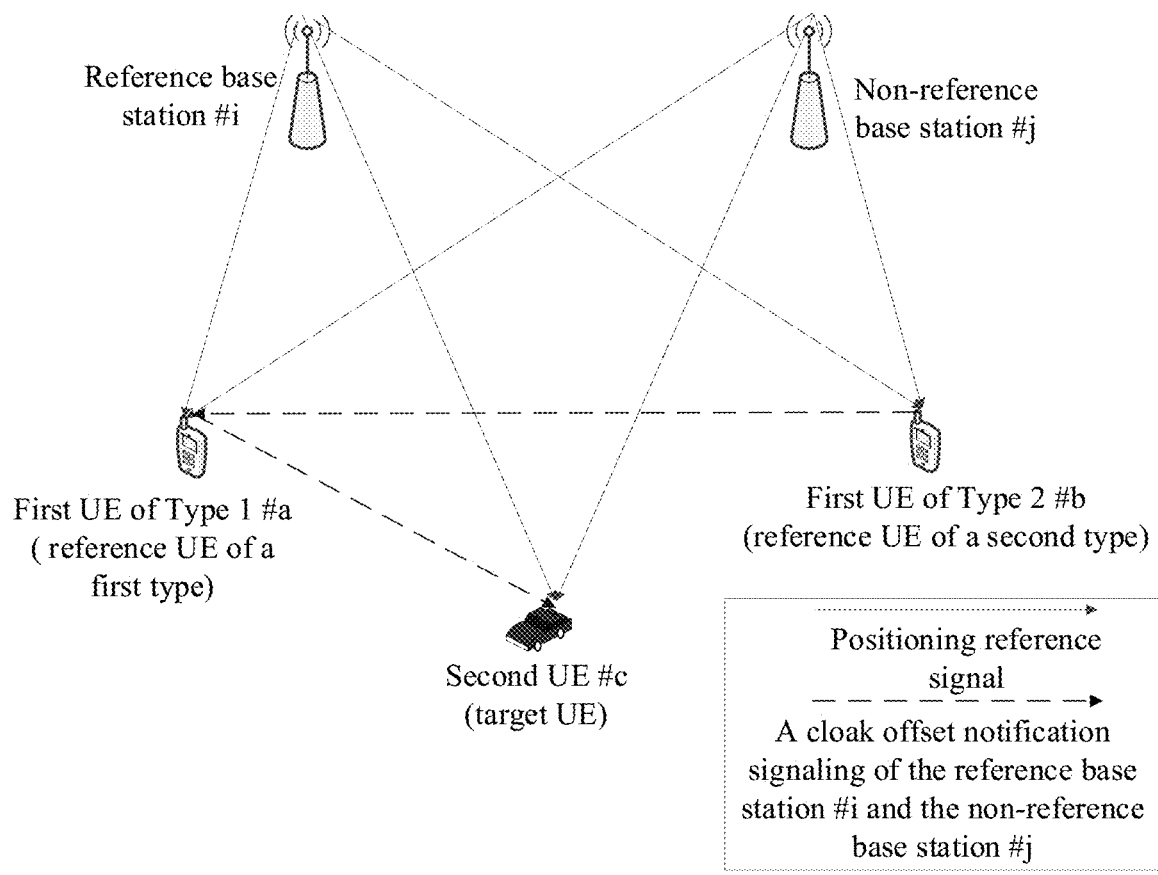
FIG. 2 is a second schematic diagram of determining a second clock offset based on a first clock offset provided by embodiments of the present application.

As shown in FIG. 2, the base station i is the reference base station, and the base station j is the non-reference base station. The first UE a of Type 1 (namely, the first UE of the first type) is special reference UE for positioning and measurement (namely, the reference UE of the first type), the first UE b of Type 2 (namely, the first UE of the second type) is special reference UE for positioning and measurement (namely, the reference UE of the second type), and the second UE c is the target UE.

Processing solutions of the first UE of Type 1, the first UE of Type 2, the second UE, the reference base station and the non-reference base station are introduced respectively below.

The clock offset determination method of the first UE of Type 1 (namely, the first UE of the first type, or the reference UE of the first type) includes the following: step 1: the reference UE of the first type receives configuration signaling of the first downlink PRS; where the first downlink PRS may be any downlink signal and includes but is not limited to a NR PRS, a NR C-PRS, a SSB and a CSI-RS; the configuration signaling may be positioning dedicated signaling from LMF, or broadcast signaling, exclusive RRC signaling of the UE or DCI signaling from the serving base station; step 2: at a moment T1, the reference UE of the first type receives and measures first downlink PRSs of the reference base station and the non-reference base station to obtain the first clock offset between the reference base station and the non-reference base station; step 3: the reference UE of the first type receives the first clock offset fed back by the reference UE of the second type and determines the second clock offset based on the predefined criterion; where the predefined criterion includes but is not limited to an arithmetic mean, selection of the first clock offset with an optimal channel condition value and a weighted mean; and the reference UE of the first type may directly receive first clock offset fed back by the reference UE of the second type via the Sidelink interface, or receive the first clock offset fed back by the reference UE of the second type through forwarding of the serving base station; and step 4: the reference UE of the first type notifies the target UE of the second clock offset, where the reference UE of the first type may notify the target UE of the second clock offset via the Sidelink interface, or forward it to the target UE via the serving base station.

The clock offset determination method of the first UE of Type 2 (namely, the first UE of the second type, or the reference UE of the second type) includes the following: step 1: the reference UE of the second type receives configuration signaling of the first downlink PRS; where the first downlink PRS may be any downlink signal and includes but is not limited to a NR PRS, a NR C-PRS, a SSB and a CSI-RS; and the configuration signaling may be positioning dedicated signaling from LMF, or broadcast signaling, exclusive RRC signaling of the UE or DCI signaling from the serving base station; step 2: at the moment T1, the reference UE of the second type receives and measures the first downlink PRSs of the reference base station and the non-reference base station to obtain the first clock offset between the reference base station and the non-reference base station; and step 3: the reference UE of the second type feeds the above first clock offset back to the reference UE of the first type.

The clock offset determination method of the second UE (namely the target UE) includes the following: step 1: the second UE receives configuration signaling of the second downlink PRS and location information of the reference base station and the non-reference base station; where the second downlink PRS may be any downlink signal and includes but is not limited to a NR PRS, a NR C-PRS, a SSB and a CSI-RS; and the configuration signaling may be positioning dedicated signaling from LMF, or broadcast signaling, exclusive RRC signaling of the UE or DCI signaling from the serving base station; step 2: at a moment T2, the second UE receives and measures the second downlink PRSs of the reference base station and the non-reference base station to obtain a first positioning measurement value (namely, the carrier phase measurement value); step 3: the second UE receives the second clock offset fed back by the reference UE of the first type; step 4: the second UE modifies the first positioning measurement value measured in step 2 based on the second clock offset to obtain the second positioning measurement value; and step 5, the second UE performs downlink positioning based on the modified second positioning measurement value, for example: the positioning solution based on the carrier phase.

Correspondingly, processing flows of the reference base station and the non-reference base station include the following: step 1: the reference base station and the non-reference base station receive configuration signaling of the first downlink PRS and the second downlink PRS, where the configuration signaling may be positioning dedicated signaling from LMF; step 2: the reference base station and the non-reference base station send the first downlink PRSs to all first UEs; and step 3: the reference base station and the non-reference base station send the second downlink PRSs to all second UEs.

Solution 3: a clock offset calibration solution for UE-based positioning with a plurality of reference UEs directly notifying the clock offset to the target UE.

In the solution 3, the first UE assists the second UE to obtain the second clock offset by using the mode 3.

In one embodiment, the plurality of first UEs (namely, the reference UEs) simultaneously measure the downlink PRSs from the reference base station and the non-reference base station to obtain the first positioning measurement value (namely, the carrier phase measurement value), and further calculate to obtain the first clock offset between the reference base station and the non-reference base station.

Then the first UE assists the target UE to obtain the second clock offset by using the mode 3: the plurality of first UEs notify the second UE of the first clock offsets via the Sidelink interface, and the second UE determines the second clock offset based on the first clock offsets and the predefined criterion.

Then the second UE modifies the first positioning measurement value based on the second clock offset to obtain the second positioning measurement value.

Finally, the second UE performs downlink positioning (the positioning solution based on the carrier phase) based on the second positioning measurement value.

The first UE (namely, reference UE) may be the common UE, or the special UE for positioning, or a road test device. In mode 2, the first UE contains two types: the first UE of Type 1 (namely, the reference UE of the first type) and the first UE of Type 2 (namely, the reference UE of the second type). The PRS may be any downlink signal and includes but is not limited to: a NR PRS, a NR C-PRS, a SSB, a CSI-RS, etc. The predefined criterion includes but is not limited to an arithmetic mean, selection of the first clock offset with an optimal channel condition value and a weighted mean.

Figure 3:
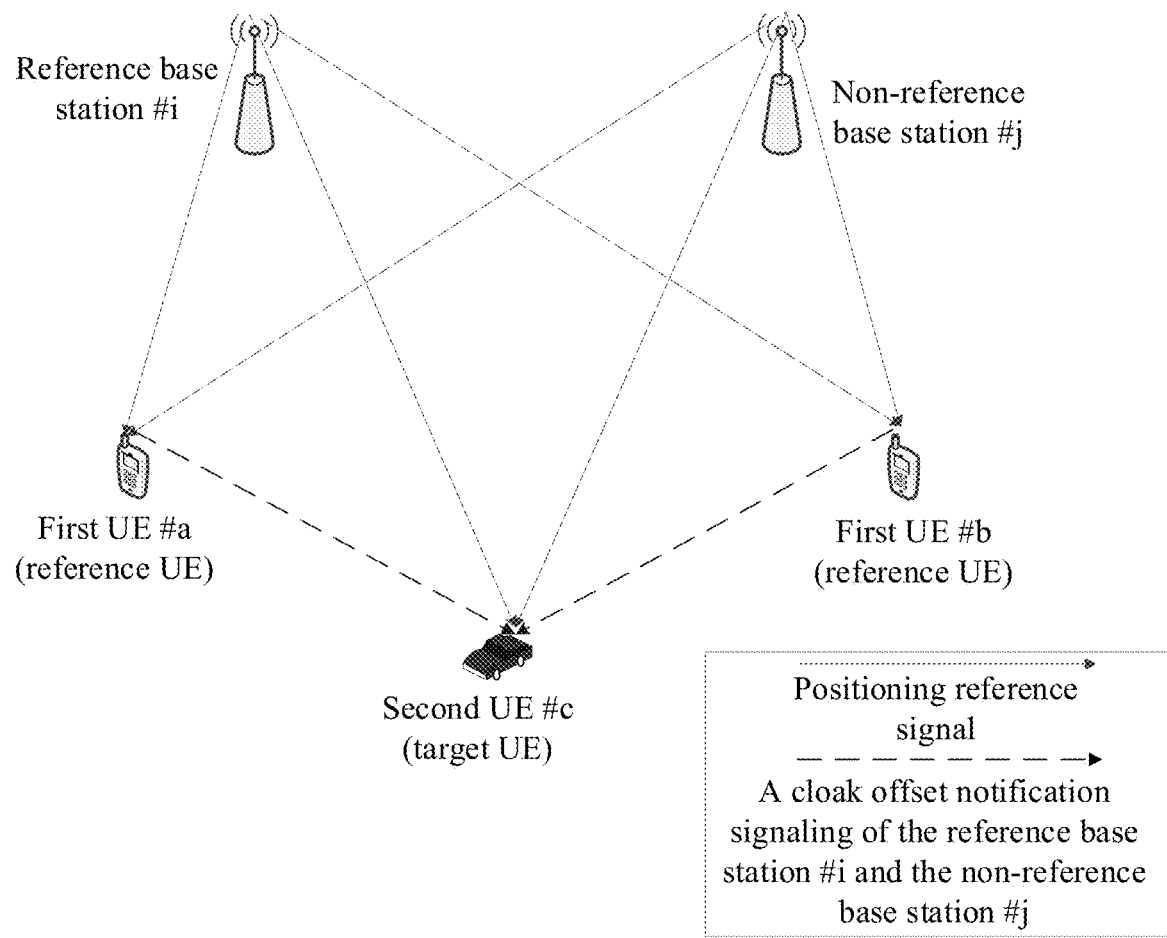
FIG. 3 is a third schematic diagram of determining a second clock offset based on a first clock offset provided by embodiments of the present application.

As shown in FIG. 3, the base station i is the reference base station, and the base station j is the non-reference base station. The first UE a and the first UE b are the reference UE, and the second UE c is the target UE.

The clock offset determination method of the first UE (the reference UE) includes the following: step 1: the first UE receives configuration signaling of the first downlink PRS, where the first downlink PRS may be any downlink signal and includes but is not limited to a NR PRS, a NR C-PRS, a SSB and a CSI-RS; and the configuration signaling may be positioning dedicated signaling from LMF, or broadcast signaling, exclusive RRC signaling of the UE or DCI signaling from the serving base station; step 2: at the moment T1, the first UE receives and measures the first downlink PRSs of the reference base station and the non-reference base station to obtain the first clock offset between the reference base station and the non-reference base station; and step 3: the first UE feeds the above first clock offset back to the second UE (the target UE), where the first UE may feed the first clock offset back to the second UE via the Sidelink interface.

The clock offset determination method of the second UE (the target UE) includes the following: step 1: the second UE receives the configuration signaling of the second downlink PRS, and location information of the reference base station and the non-reference base station; where the second downlink PRS may be any downlink signal and includes but is not limited to a NR PRS, a NR C-PRS, a SSB and a CSI-RS, and the configuration signaling may be positioning dedicated signaling from LMF, or broadcast signaling, exclusive RRC signaling of the UE or DCI signaling from the serving base station; step 2: at the moment T2, the second UE receives and measures the second downlink PRSs of the reference base station and the non-reference base station to obtain the first positioning measurement value (namely, the carrier phase measurement value); step 3: the second UE receives the second clock offset fed back by all the first UE, where the second UE determines the second clock offset based on the predefined criterion, and the predefined criterion includes but is not limited to an arithmetic mean, selection of the first clock offset with an optimal channel condition value and a weighted mean; step 4: the second UE modifies the first positioning measurement value measured in step 2 based on the second clock offset to obtain the second positioning measurement value; and step 5: the second UE performs downlink positioning based on the second positioning measurement value, for example: the positioning solution based on the carrier phase.

Correspondingly, the processing flows of the reference base station and the non-reference base station include the following: step 1: the reference base station and the non-reference base station receive the configuration signaling of the first downlink PRS and the second downlink PRS, and the configuration signaling is positioning dedicated signaling from LMF; step 2: the reference base station and the non-reference base station send the first downlink PRSs to all the first UEs; and step 3: the reference base station and the non-reference base station send the second downlink PRSs to all the second UEs.

Specific introduction of the embodiments is given below.

Embodiment 1

As shown in FIG. 1, in an embodiment 1, description is made specific to the first UE (namely, reference UE) and the second UE (namely target UE) in solution 1, where the first UE a is special reference UE for positioning and measurement; a first positioning measurement value measured by the target UE c is a carrier phase measurement value; a PRS is NR C-PRS; a base station i is a reference base station; and a base station j is a non-reference base station.

A clock offset determination method of the first UE (the reference UE) a includes the following.

Step 1: the first UE a receives configuration signaling of a first downlink PRS, where the first downlink PRS may be a NR C-PRS; and the configuration signaling may be positioning dedicated signaling from LMF, or broadcast signaling, exclusive RRC signaling of the UE or DCI signaling from a serving base station.

Step 2: at a moment T1, the first UE a receives and measures first downlink PRSs of the reference base station i and the non-reference base station j to obtain a first clock offset between the reference base station i and the non-reference base station j.

In one embodiment, the first UE a measures a C-PRS sent by the base station i and locks a phase to obtain a carrier phase measurement value $P_a^i$, so $P_a^i$ can be expressed at a moment k as follows:

$$\lambda P_a^i(k) = r_a^i + c(b_{r,a}(k) - b_{t,i}(k)) - \lambda N_a^i + w_{a,P}^i(k) \quad (1).$$

Where $r_a^i$ is an ideal distance between the reference base station i and the reference UE a and may be obtained through a known location of a base station. $P_a^i$ is the carrier phase measurement value with a carrier cycle as a device, $\lambda$ is a carrier wavelength of C-PRS, $N_a^i$ is an unknown ambiguity of whole cycles, and $w_{a,P}^i$ is a carrier phase measurement error. A phase measurement error is usually only 10% of a carrier wavelength and may be ignored when a base station clock offset is discussed. c is a speed of light, namely, 3.0*10^8 (m/s), and $b_{r,a}$ and $b_{t,i}$ are respectively clock offsets (namely, time synchronization errors) of the first UE a and the base station i.

In one embodiment, the carrier phase measurement value $P_a^j$ obtained, by the first UE a, by measuring the C-PRS signal sent by the base station j is:

$$\lambda P_a^j(k) = r_a^j + c(b_{r,a}(k) - b_{t,j}(k)) - \lambda N_a^j + w_{a,P}^j(k) \quad (2).$$

It may be obtained by subtracting the above two formulas that at a moment k, a single differential carrier phase measurement value $\lambda P_a^{ij}(k)$ by the first UE a specific to the reference base station i and the non-reference base station j is:

$$\lambda P_a^{ij}(k) = \lambda P_a^i(k) - \lambda P_a^j(k) = \delta r_a^{ij} + c(\delta b_a^{ij}(k)) - \lambda N_a^{ij} + \delta w_{a,P}^{ij}(k) \quad (3).$$

Where $\delta b_a^{ij}(k) = b_{t,j}(k) - b_{t,i}(k)$ represents a clock offset between the reference base station i and a non-reference base station j, $\delta r_a^{ij} = r_a^j - r_a^i$ represents an ideal distance difference between the first UE and the reference base station i as well as the non-reference base station j, and $\delta w_{a,P}^{ij} = w_{a,P}^j - w_{a,P}^i$ is a difference of carrier phase measurement errors.

A single-differential ambiguity of whole cycles $N_a^{ij}$ is obtained through estimation by using an algorithm based on a carrier phase measurement single-differential value $\lambda P_a^{ij}$. For example: $N_a^{ij}$ is directly estimated based on an extended kalman filter (EKF) algorithm, or double differential is performed on a carrier phase measurement value of two receiving antennas of the first UE a, and ambiguity of whole cycles of the double differential is calculated and then put in a single differential formula to obtain ambiguity of whole cycles $N_a^{ij}$ of a single differential. Then a first clock offset value $\delta b_a^{ij}(k)$ of the base station i and the base station j at the moment k is obtained through estimation:

$$\hat{\delta b}_a^{ij}(k) = \frac{1}{c}(\lambda P_a^{ij}(k) + \lambda N_a^{ij} - \delta r_a^{ij}). \quad (4)$$

Average noise suppression processing is performed through a plurality of moments $\hat{\delta b}_a^{ij}(k)$ to obtain a first clock offset value $\hat{\delta b}_a^{ij}$, estimated by the first UE a, of the reference base station i and the non-reference base station j.

$$\hat{\delta b}_a^{ij} = \Sigma_{k=0}^{K-1} \hat{\delta b}_a^{ij}(k) \quad (5),$$

where K is a positive integer larger than or equal to 1.

Step 3: the first UE a notifies the target UE c of the first clock offset $\hat{\delta b}_a^{ij}$.

A clock offset determination method of a second UE (a target UE) c includes the following.

Step 1: the second UE c receives configuration signaling of a second downlink PRS, and location information of a reference base station and a non-reference base station; where the second downlink PRS may be a NR C-PRS, the configuration signaling may be positioning dedicated signaling from LMF, or broadcast signaling, exclusive RRC signaling of the UE or DCI signaling from a serving base station.

Step 2: at a moment T2, the second UE c receives and measures second downlink PRSs of the reference base station and the non-reference base station to obtain a first positioning measurement value (a carrier phase).

Step 3: the second UE c receives a first clock offset estimated value $\hat{\delta b}_a^{ij}$ fed back by the first UE a to directly use it as a second clock offset $\hat{\delta b}_c^{ij}$.

Step 4: the second UE c modifies the first positioning measurement value (the carrier phase) measured in step 2 based on the second clock offset $\hat{\delta b}_c^{ij}$ to obtain a second positioning measurement value.

In one embodiment, the first positioning measurement value (the carrier phase) $P_c^{ij}(k)$ of the base station i and the base station j measured by the second UE (the target UE) c is: $\lambda P_c^{ij}(k) = \lambda P_c^i(k) - \lambda_c P_c^j(k) = \delta r_c^{ij} + c(\delta b_c^{ij}(k)) - \lambda N_c^{ij} + \delta w_{c,P}^{ij}(k)$ (6), the second UE (the target UE) c modifies the first positioning measurement value (the carrier phase) $P_a^{ij}(k)$ based on a second clock offset estimation value $\hat{\delta b}_c^{ij}$ by using the following formula: $\lambda P'_c^{ij}(k) = \lambda P_c^{ij}(k) - c(\hat{\delta b}_c^{ij}) = \delta r_c^{ij} - \lambda N_c^{ij} + \delta w_{c,P}^{ij}(k)$ (7), where in one embodiment $\delta b_c^{ij}(k) = \hat{\delta b}_c^{ij}$.

Step 5: the second UE c performs downlink positioning based on the second positioning measurement value $P'_c^{ij}(k)$ obtained after modifying, for example: a positioning solution based on the carrier phase.

A maximum value of a clock offset between base stations in an existing TDD system is 50 ns or minus 50 ns, and after the above processing, a residual clock offset may be about 1 ns.

Embodiment 2

As shown in FIG. 2, in an embodiment 2, description is made specific to the first UE of Type 1 (namely, reference UE of a first type), the first UE of Type 2 (namely, reference UE of a second type), and the second UE (namely, target UE) in solution 2. Where the first UE a of Type 1 is special reference UE of the first type for positioning and measurement, the first UE b of Type 2 is special reference UE of the second type for positioning and measurement, a first positioning measurement value measured by the target UE c is a carrier phase measurement value, a PRS is NR C-PRS, a base station i is a reference base station, and a base station j is a non-reference base station.

A clock offset determination method of the first UE of Type 1 (namely, the reference UE of the first type) includes the following.

Step 1: the first UE a of Type 1 receives configuration signaling of a first downlink PRS; where the first downlink PRS may be a NR C-PRS; and the configuration signaling may be positioning dedicated signaling from LMF, or broadcast signaling, exclusive RRC signaling of the UE or DCI signaling from a serving base station.

Step 2: at a moment T1, the first UE a of Type 1 receives and measures first downlink PRSs of the reference base station and the non-reference base station to obtain a first clock offset between the reference base station i and the non-reference base station j.

In one embodiment, the first UE a of Type 1 measures a C-PRS sent by the base station i and locks a phase to obtain a carrier phase measurement value $P_a^i$, so $P_a^i$ may be expressed at a moment k as follows:

$$\lambda P_a^i(k) = r_a^i + c(b_{r,a}(k) - b_{t,i}(k)) - \lambda N_a^i + w_{a,P}^i(k) \qquad (8).$$

Where $r_a^i$ is an ideal distance between the reference base station i and the first UE a of Type 1, and may be obtained through a known location of a base station and a known location of the first UE a of Type 1. $P_a^i$ is a carrier phase measurement value with a carrier cycle as a device, $\lambda$ is a carrier wavelength of C-PRS, $N_a^i$ is unknown ambiguity of whole cycles, and $w_{a,P}^i$ is a carrier phase measurement error. The phase measurement error is usually only 10% of a carrier wavelength and may be ignored when a base station clock offset is discussed. c is speed of light, namely 3.0*10^8 (m/s), and $b_{r,a}$ and $b_{t,i}$ are respectively clock offsets (namely, a time synchronization error) of the UE a and the base station i.

In one embodiment, the carrier phase measurement value obtained, by the first UE a of Type 1, by measuring the C-PRS sent by the base station j is $P_a^j$:

$$\lambda P_a^j(k) = r_a^j + c(b_{r,a}(k) - b_{t,j}(k)) - \lambda N_a^j + w_{a,P}^j(k) \qquad (9).$$

It may be obtained by subtracting the above two formulas that at the moment k, a single differential carrier phase measurement value $\lambda P_a^{ij}(k)$ by the first UE a of Type 1 specific to the reference base station i and non-reference base station j is:

$$\lambda P_a^{ij}(k) = \lambda P_a^i(k) - \lambda P_a^j(k) = \delta r_a^{ij} + c(\delta b_a^{ij}(k)) - \lambda N_a^{ij} + \delta w_{a,P}^{ij}(k) \qquad (10).$$

Where $\delta b_a^{ij}(k) = b_{t,j}(k) - b_{t,i}(k)$ represents a clock offset between the reference base station i and the non-reference base station j, $\delta r_a^{ij} = r_a^j - r_a^i$ represents an ideal distance difference between the first UE a of Type 1 and the reference base station i as well as the non-reference base station j, and $\delta w_{a,P}^{ij} = w_a^j - w_{a,P}$ is a difference of carrier phase measurement errors.

A single-differential ambiguity of whole cycles $N_a^{ij}$ can be estimated by using an algorithm based on a carrier phase measurement single-differential value $\lambda P_a^{ij}$. For example: $N_a^{ij}$ is directly estimated based on an EKF algorithm or double differential is performed on a carrier phase measurement value of two receiving antennas of the first UE a of Type 1, and ambiguity of whole cycles of the double differential is calculated and then put in a single differential formula to obtain ambiguity of whole cycles $N_a^{ij}$ of the single differential. Then a first clock offset value $\delta b_a^{ij}(k)$ of the base station i and the base station j at the moment k is estimated:

$$\hat{\delta b}_a^{ij}(k) = \frac{1}{c}\left(\lambda P_a^{ij}(k) + \lambda N_a^{ij} - \delta r_a^{ij}\right). \qquad (11)$$

Average noise suppression processing is performed on a plurality of moments $\hat{\delta b}_a^{ij}(k)$ to obtain a first clock offset value $\hat{\delta b}_a^{ij}$, estimated by the first UE a of Type 1, of the reference base station i and the non-reference base station j:

$$\hat{\delta b}_a^{ij} = \Sigma_{k=0}^{K-1} \hat{\delta b}_a^{ij}(k) \qquad (12).$$

Step 3: the first UE a of Type 1 receives the first clock offset $\hat{\delta b}_b^{ij}$ fed back by the first UE b of Type 2 and a first clock offset $\hat{\delta b}_a^{ij}$ obtained by measurement itself, and determines a second clock offset based on a predefined criterion.

Through the first clock offset measured by the first UE a of Type 1 united with two reference UEs (the first UE a of Type 1 and the first UE b of Type 2), a more accurate second clock offset $\hat{\delta}_b^{ij}$ may be worked out between the reference base station i and the non-reference base station j, and there are at least three calculation methods as follows.

Embodiment 1: an arithmetic mean, for example:

$$\hat{\delta b}^{ij} = \frac{1}{2}\left(\hat{\delta b}_a^{ij} + \hat{\delta b}_b^{ij}\right).$$

Embodiment 2: a clock offset of reference UE with an optimal channel condition (for example: a channel condition of UE with the largest reference signal receiving power (RSRP) and/or signal to interference plus noise ratio (SINR) is optimal) is used as a second clock offset $\hat{\delta b}^{ij}$, for example:

the RSRP and/or SINR of reference UE a is larger than the RSRP and/or SINR of reference UE b, that is, the RSRP of the reference UE a is larger than the RSRP of the reference UE b, and/or, the SINR of the reference UE a is larger than the SINR of the reference UE b, so $\hat{\delta}b^{ij}=\hat{\delta}b_a^{ij}$ is selected, otherwise, $\hat{\delta}b^{ij}=\hat{\delta}b_b^{ij}$ is selected.

Embodiment 3: a weighted mean, for example: $\hat{\delta}b^{ij}=(f)\hat{\delta}b_a^{ij}+(1-f)\hat{\delta}b_b^{ij}$, where f is a weighting coefficient between 0 and 1, and a value of the weighting coefficient f can be determined according to channel conditions of the UE a and the UE b.

Step 4: the first UE a of Type 1 notifies the second UE c of the second clock offset $\hat{\delta}b^{ij}$.

A clock offset determination method of the first UE of Type 2 (namely, reference UE of the second type) includes the following.

Step 1: the first UE b of Type 2 receives configuration signaling of a first downlink PRS; where the first downlink PRS may be a NR C-PRS; and the configuration signaling may be positioning dedicated signaling from LMF, or broadcast signaling, exclusive RRC signaling of the UE or DCI signaling from a serving base station.

Step 2: at the moment T1, the first UE b of Type 2 receives and measures the first downlink PRS of the reference base station i and the non-reference base station j to obtain a first clock offset between the reference base station i and the non-reference base station j. According to formula (8) to formula (12), a first clock offset value $\hat{\delta}b_b^{ij}$, estimated by the first UE b of Type 2, of the reference base station i and the non-reference base station j may be obtained.

Step 3: the first UE b of Type 2 feeds the above first clock offset $\hat{\delta}b_b^{ij}$ back to the first UE a of Type 1.

A clock offset determination method of the second UE (the target UE) includes the following.

Step 1: the second UE c receives configuration signaling of a second downlink PRS and location information of a reference base station and a non-reference base station; where the second downlink PRS may be a NR C-PRS; and the configuration signaling may be positioning dedicated signaling from LMF, or broadcast signaling, exclusive RRC signaling of the UE or DCI signaling from the serving base station.

Step 2: at the moment T2, the second UE c receives and measures second downlink PRSs of the reference base station and the non-reference base station to obtain a first positioning measurement value (a carrier phase).

Step 3: the second UE c receives a second clock offset estimated value $\hat{\delta}b^{ij}$ fed back by the reference UE a of the first type.

Step 4: the second UE c modifies the first positioning measurement value (the carrier phase) measured in step 2 based on the second clock offset to obtain a second positioning measurement value.

In one embodiment, the first positioning measurement value (the carrier phase) $\lambda P_c^{ij}(k)$ of the base station i and the base station j measured by the second UE (the target UE) c is: $\lambda P_c^{ij}(k)=\lambda P_c^i(k)-\lambda P_c^j(k)=\delta r_c^{ij}+c(\delta b_c^{ij}(k))-\lambda N_c^{ij}+\delta w_{c,P}^{ij}(k)$ (13), the second UE (the target UE) c modifies the first positioning measurement value (the carrier phase) $\lambda P_c^{ij}(k)$ based on a second clock offset estimated value $\hat{\delta}b^{ij}$ by using the following formula: $\lambda P'^{ij}_c(k)=\lambda P_c^{ij}(k)-c(\hat{\delta}b_{ij})=\delta r_c^{ij}-\lambda N_c^{ij}+\delta w_{c,P}^{ij}(k)$ (14), where in one embodiment, $\delta b_c^{ij}(k)=\hat{\delta}b_{ij}$.

Step 5: the second UE c performs downlink positioning based on the second positioning measurement value $P'^{ij}_c(k)$ obtained after modifying, for example: a positioning solution based on the carrier phase.

A maximum value of a clock offset between base stations in an existing TDD system is 50 ns or minus 50 ns, and after the above processing, a residual clock offset may be about 1 ns.

Embodiment 3

As shown in FIG. 3, in an embodiment 3, description is made specific to the first UE (namely, the reference UE) and the second UE (namely, target UE) in solution 3; where the first UE a and the first UE b are special reference UE for positioning and measurement, a first positioning measurement value measured by the second UE (the target UE) c is a carrier phase measurement value, a PRS is a NR C-PRS, a base station i is a reference base station, and a base station j is a non-reference base station.

The difference between embodiment 3 and embodiment 2 is that a plurality of first UEs (the reference UEs) directly notify the second UE (the target UE) of the first clock offsets, and a second clock offset is determined by the target UE.

A clock offset determination method of the first UE (the reference UE) a and b includes the following.

Step 1: the first UE a and b receive configuration signaling of a first downlink PRS; where the first downlink PRS may be a NR C-PRS; and the configuration signaling may be positioning dedicated signaling from LMF, or broadcast signaling, exclusive RRC signaling of the UE or DCI signaling from a serving base station.

Step 2: at the moment T1, the first UE a and b receive and measure first downlink PRSs of the reference base station i and the non-reference base station j to obtain a first clock offset between the reference base station i and the non-reference base station j. According to formulas (1) to (5), a first clock offset value $\hat{\delta}b_a^{ij}$, estimated by the first UE a, of the reference base station i and the non-reference base station j, and a first clock offset value $\hat{\delta}b_b^{ij}$, estimated by the first UE b, of the reference base station i and the non-reference base station j may be obtained.

Step 3: the first UE a and b notify the target UE c of the first clock offsets $\hat{\delta}b_a^{ij}$ and A clock offset determination method of the second UE (the target UE) c includes the following.

Step 1: the second UE c receives configuration signaling of a second downlink PRS and location information of a reference base station and a non-reference base station; where the second downlink PRS may be a NR C-PRS; and the configuration signaling may be positioning dedicated signaling from LMF, or broadcast signaling, exclusive RRC signaling of the UE or DCI signaling from a serving base station.

Step 2: at the moment T2, the second UE c receives and measures second downlink PRSs of the reference base station and the non-reference base station to obtain a first positioning measurement value (a carrier phase).

Step 3: the second UE c receives first clock offset estimated values $\hat{\delta}b_a^{ij}$ and $\hat{\delta}b_b^{ij}$ fed back by the first UE a and b, and determines a second clock offset $\hat{\delta}b^{ij}$ based on a predefined criterion.

Through the first clock offset measured by the second UE united with the two first UEs (the first UE a and the first UE b), a more accurate second clock offset $\hat{\delta}b^{ij}$ between the reference base station i and the non-reference base station j may be worked out, and there are at least three calculation methods as follows.

Embodiment 1: an arithmetic mean, for example:

$$\hat{\delta b}^{ij} = \frac{1}{2}(\hat{\delta b}_a^{ij} + \hat{\delta b}_b^{ij}).$$

Embodiment 2: a clock offset of reference UE with an optimal channel condition (for example: a channel condition of the UE with the largest RSRP and/or SINR is optimal) is selected as the second clock offset $\hat{\delta b}^{ij}$, for example: the RSRP and/or SINR of the reference UE a is larger than the RSRP and/or SINR of the reference UE b, that is, the RSRP of the reference UE a is larger than the RSRP of the reference UE b, and/or, the SINR of the reference UE a is larger than the SINR of the reference UE b, so $\hat{\delta b}^{ij} = \hat{\delta b}_a^{ij}$ is selected, otherwise, $\hat{\delta b}^{ij} = \hat{\delta b}_b^{ij}$ is selected.

Embodiment 3: a weighted mean, for example: $\hat{\delta b}^{ij} = (f)\hat{\delta b}_a^{ij} + (1-f)\hat{\delta b}_b^{ij}$, where f is a weighting coefficient between 0 and 1, and a value of f may be determined according to channel conditions of the first UE a and the first UE b.

Step 4: the second UE c modifies the first positioning measurement value (the carrier phase) measured in step 2 based on the second clock offset $\hat{\delta b}^{ij}$ to obtain a second positioning measurement value $P'^{ij}_c(k)$.

In one embodiment, the first positioning measurement value (the carrier phase) $\lambda P^{ij}_c(k)$ of the base station i and the base station j measured by the second UE (the target UE) c is: $\lambda P^{ij}_c(k) = \lambda P^i_c(k) - \lambda P^j_c(k) = \delta r^{ij}_c + c(\delta b^{ij}_c(k)) - \lambda N^{ij}_c + \delta w^{ij}_{c,P}(k)$ (15), the second UE c modifies the first positioning measurement value (the carrier phase) $\lambda P^{ij}_c(k)$ based on a second clock offset estimated value $\hat{\delta b}^{ij}$ by using the following formula: $\Delta P'^{ij}_c(k) = \lambda P^{ij}_c(k) - c(\hat{\delta b}^{ij}) = \delta r^{ij}_c - \lambda N^{ij}_c + \delta^{ij}_{c,P}(k)$ (16), where, in one embodiment, $\delta b^{ij}_c(k) = \hat{\delta}_b^{ij}$.

Step 5: the second UE c performs downlink positioning based on the second positioning measurement value $P'^{ij}_c(k)$ obtained after modifying, for example: a positioning solution based on the carrier phase.

A maximum value of a clock offset between base stations in an existing TDD system is 50 ns or minus 50 ns, and after the above processing, a residual clock offset may be about 1 ns.

Figure 4:
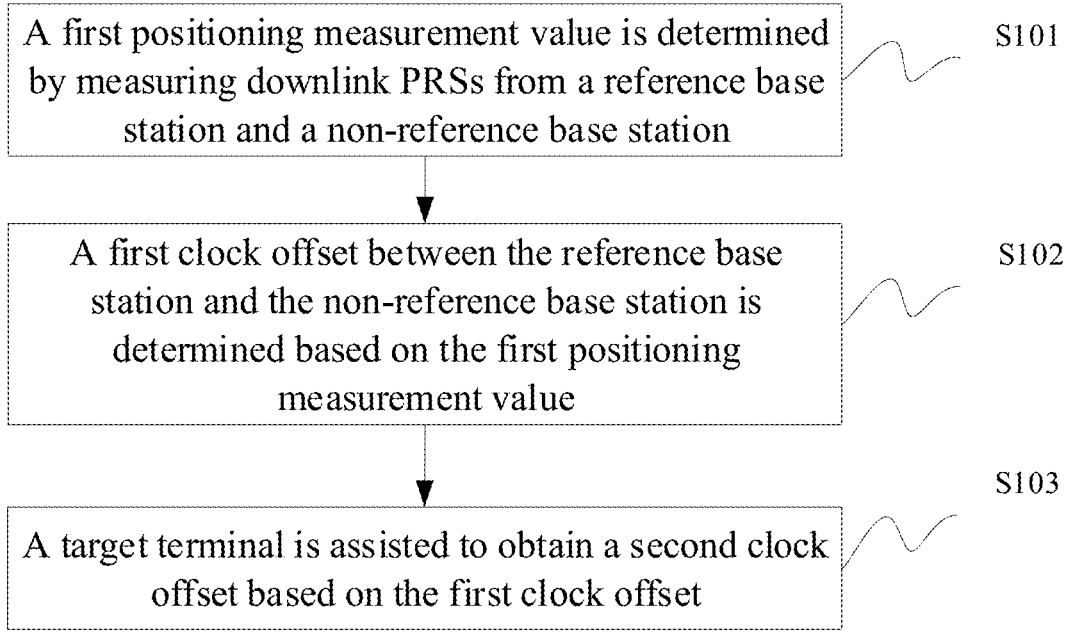
FIG. 4 is a schematic flowchart of a clock offset determination method at a reference terminal side provided by embodiments of the present application.

To sum up, referring to FIG. 4, at a first terminal side, an embodiment of the present application provides a clock offset determination method, including the following.

S101, a first positioning measurement value is determined by measuring downlink PRSs from a reference base station and a non-reference base station.

S102, a first clock offset between the reference base station and the non-reference base station is determined based on the first positioning measurement value.

S103, a target terminal is assisted to obtain a second clock offset based on the first clock offset.

In one embodiment, the step that the target terminal is assisted to obtain the second clock offset based on the first clock offset specifically in one of the following modes: mode 1, the first clock offset is directly used as the second clock offset, and the target terminal is notified via a Sidelink interface; mode 2, the first clock offset is fed back to a first terminal of a first type via the sidelink interface, the second clock offset is determined by the first terminal of the first type based on the first clock offset and a predefined criterion, and is notified to the target terminal via the Sidelink interface; and mode 3, the target terminal is notified of the first clock offset via the Sidelink interface, and the second clock offset is determined by the target terminal based on the first clock offset and the predefined criterion.

In one embodiment, the predefined criterion includes one or a combination of the following calculating criteria: an arithmetic mean, selection of the first clock offset with an optimal channel condition value or a weighted mean.

In one embodiment, the PRSs include one or a combination of the following signals: a NR PRS, a C-PRS, a SSB or a CSI-RS.

Figure 5:
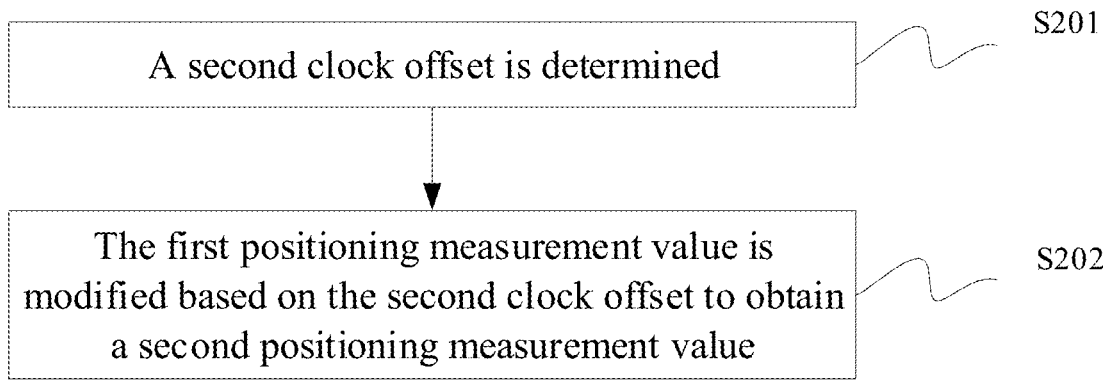
FIG. 5 is a schematic flowchart of a clock offset determination method at a target terminal side provided by embodiments of the present application.

Correspondingly, referring to FIG. 5, at a second terminal side, a clock offset determination method provided by an embodiment of the present application includes the following.

S201, a second clock offset is determined, where the second clock offset is determined based on a first clock offset between a reference base station and a non-reference base station, and the first clock offset is determined based on a first positioning measurement value which is determined by a first terminal by measuring downlink PRSs from the reference base station and the non-reference base station.

S202, the first positioning measurement value is modified based on the second clock offset to obtain a second positioning measurement value.

In one embodiment, the method further includes: performing downlink positioning based on the second positioning measurement value.

In one embodiment, the second clock offset is determined in one of the following modes: mode 1, the first clock offset notified by the first terminal is received via a Sidelink interface, and the first clock offset is used as the second clock offset; mode 2, the second clock offset notified by the first terminal of a first type is received via the Sidelink interface, the second clock offset is determined by the first terminal of the first type based on the first clock offset and a predefined criterion, and the first clock offset is determined by the first terminal of a second type and fed back to the first terminal of the first type via the Sidelink interface; and mode 3, first clock offsets notified by a plurality of first terminals are received via the Sidelink interface, and the second clock offset is determined based on the first clock offsets and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

Figure 6:
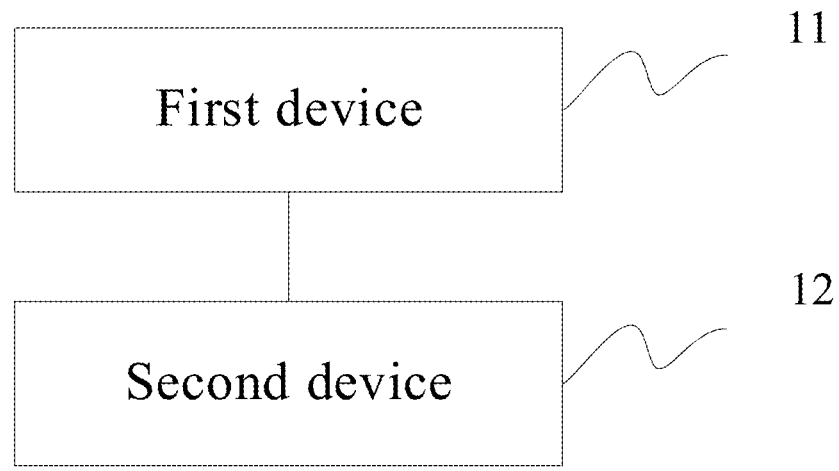
FIG. 6 is a schematic structural diagram of a clock offset determination apparatus at a reference terminal side provided by embodiments of the present application.

Referring to FIG. 6, at a first terminal side, a clock offset determination apparatus provided by an embodiment of the present application includes: a first device 11, configured to determine a first positioning measurement value by measuring downlink PRSs from a reference base station and a non-reference base station; and a second device 12, configured to determine a first clock offset between the reference base station and the non-reference base station based on the first positioning measurement value; and assist a target terminal to obtain a second clock offset based on the first clock offset.

In one embodiment, the second device 12 is configured to assist the target terminal to obtain the second clock offset based on the first clock offset specifically in one of the following modes: mode 1, the first clock offset is directly used as the second clock offset, and the target terminal is notified via a Sidelink interface; mode 2, the first clock offset is fed back to a first terminal of a first type via the sidelink interface, the second clock offset is determined by the first terminal of the first type based on the first clock offset and a predefined criterion, and is notified to the target terminal via the Sidelink interface; and mode 3, the target terminal is notified of the first clock offset via the Sidelink interface, and the second clock offset is determined by the target terminal based on the first clock offset and the predefined criterion.

In one embodiment, the predefined criterion includes one or a combination of the following calculating criteria: an arithmetic mean, selection of the first clock offset with an optimal channel condition value or a weighted mean.

In one embodiment, the PRSs include one or a combination of the following signals: a NR PRS, a NR C-PRS, a SSB or a CSI-RS.

Figure 7:
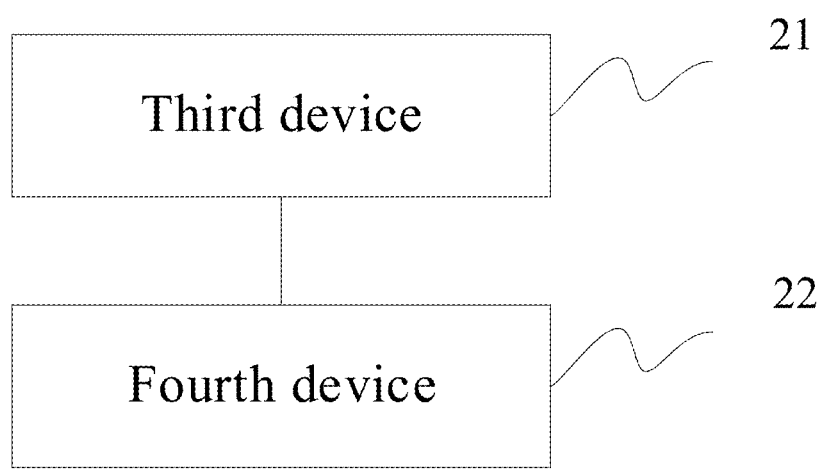
FIG. 7 is a schematic structural diagram of a clock offset determination apparatus at a target terminal side provided by embodiments of the present application.

Referring to FIG. 7, at a second terminal side, a clock offset determination apparatus provided by an embodiment of the present application includes: a third device 21, configured to determine a second clock offset, where the second clock offset is determined based on a first clock offset between a reference base station and a non-reference base station, and the first clock offset is determined based on a first positioning measurement value which is determined by a first terminal by measuring downlink PRSs from the reference base station and the non-reference base station; and a fourth device 22, configured to modify the first positioning measurement value based on the second clock offset to obtain a second positioning measurement value.

In one embodiment, the fourth device 22 is further configured to: perform downlink positioning based on the second positioning measurement value.

In one embodiment, the third device 21 is configured to determine the second clock offset in one of the following modes: mode 1, the first clock offset notified by the first terminal is received via a Sidelink interface, and the first clock offset is used as the second clock offset; mode 2, the second clock offset notified by the first terminal of a first type is received via the Sidelink interface, the second clock offset is determined by the first terminal of the first type based on the first clock offset and a predefined criterion, and the first clock offset is determined by the first terminal of a second type and fed back to the first terminal of the first type via the Sidelink interface; and mode 3, first clock offsets notified by a plurality of first terminals are received via the Sidelink interface, and the second clock offset is determined based on the first clock offsets and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

Figure 8:
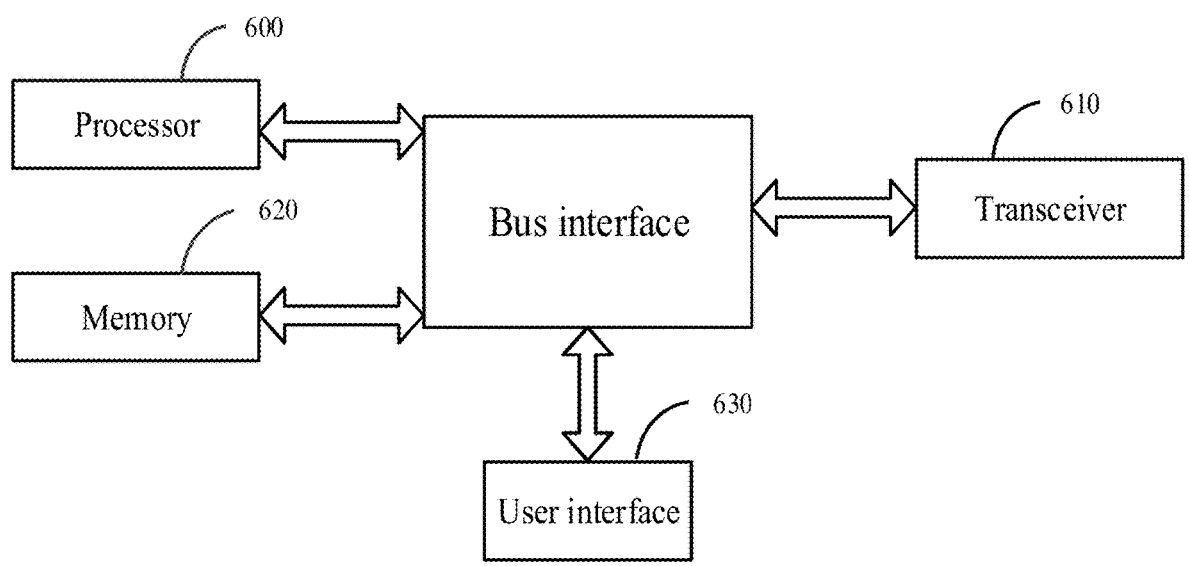
FIG. 8 is a schematic structural diagram of a terminal provided by embodiments of the present application.

Referring to FIG. 8, a terminal provided by an embodiment of the present application includes a processor 600 and a memory 620.

When the terminal is used as a first terminal, the processor 600 is configured to read a program in the memory 620 and execute the following process: a first positioning measurement value is determined by measuring downlink PRSs from a reference base station and a non-reference base station; a first clock offset between the reference base station and the non-reference base station is determined based on the first positioning measurement value; and a target terminal is assisted to obtain a second clock offset based on the first clock offset.

In one embodiment, the processor 600 is configured to assist the target terminal to obtain the second clock offset specifically in one of the following modes based on the first clock offset: mode 1, the first clock offset is directly used as the second clock offset, and the target terminal is notified via the Sidelink interface; mode 2, the first clock offset is fed back to the first terminal of the first type via the Sidelink interface, the second clock offset is determined by the first terminal of the first type based on the first clock offset and a predefined criterion, and is notified to the target terminal via the Sidelink interface; and mode 3, the target terminal is notified of the first clock offset via the Sidelink interface, and the second clock offset is determined by the target terminal based on the first clock offset and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

Besides, when the terminal is used as the second terminal, the processor 600 is further configured to: determine a second clock offset, where the second clock offset is determined based on the first clock offset between the reference base station and the non-reference base station, and the first clock offset is determined based on the first positioning measurement value which is determined by the first terminal by measuring the downlink PRSs from the reference base station and the non-reference base station; and modify the first positioning measurement value based on the second clock offset to obtain a second positioning measurement value.

In one embodiment, the processor 600 is further configured to: perform downlink positioning based on the second positioning measurement value.

In one embodiment, the processor 600 is configured to determine the second clock offset in one of the following modes: mode 1, the first clock offset notified by the first terminal is received via the Sidelink interface, and the first clock offset is used as the second clock offset; mode 2, the second clock offset notified by the first terminal of a first type is received via the Sidelink interface, the second clock offset is determined by the first terminal of the first type based on the first clock offset and a predefined criterion, and the first clock offset is determined by the first terminal of a second type and fed back to the first terminal of the first type via the Sidelink interface; and mode 3, first clock offsets notified by a plurality of first terminals are received via the Sidelink interface, and the second clock offset is determined based on the first clock offsets and the predefined criterion.

In one embodiment, the predefined criterion includes one or a combination of the following calculating criteria: an arithmetic mean, selection of the first clock offset with an optimal channel condition value, or a weighted mean.

In one embodiment, the PRSs include one or a combination of the following signals: a NR PRS, a NR C-PRS, a SSB or a CSI-RS.

A transceiver 610 is configured to receive and send data under control of the processor 600.

In FIG. 8, a bus architecture may include any quantity of interconnected buses and bridges, specifically linking various circuits of one or more processors represented by the processor 600 and memories represented by the memory 620. The bus architecture may also link various other circuits such as a peripheral device, a voltage stabilizer and a power management circuit, which is known in the art and therefore will not be further described herein. A bus interface provides an interface. The transceiver 610 may be a plurality of components, including a transmitter and a receiver and providing a device for communicating with various other apparatuses on a transmission medium. As for different user equipment, a user interface 630 may also be an interface may be internally or externally connected with a needed device, and the needed device includes but is not limited to a keypad, a display, a speaker, a microphone, a joystick, etc.

The processor 600 is responsible for managing the bus architecture and general processing. The memory 620 can store data used during executing of operations by the processor 600.

In one embodiment, the processor 600 may be a central processing device (CPU), an application specific integrated circuit (ASIC), a field-programmable gate array (FPGA) or a complex programmable logic device (CPLD).

It needs to be noted that dividing of units in the embodiment of the present application is exemplary, which is only dividing of logical functions and may have other dividing modes during actual implementation. Besides, all functional devices in all embodiments of the present application may be integrated into one processing device, or all the devices may physically and independently exist, or two or more devices may be integrated into one device. The above integrated device may be realized by using a hardware form or a software functional unit form.

The integrated device, if realized in the software functional unit form and sold or applied as an independent product, can be stored in a computer readable storage medium. Based on understanding like this, the present application essentially or a part of them making contributions on an existing art or all or a part of the embodiments may be embodied in a form of a software product, the computer software product is stored in a storage medium and includes several instructions for making a computer device (may be a personal computer, a server or a network device, etc.) or a processor execute all or a part of steps of the method of each embodiment of the present application. The above mentioned storage medium includes: a USB flash disk, a mobile hard disk, a read-only memory (ROM), a random access memory (RAM), a diskette or an optical disk and various media may store program codes.

An embodiment of the present application provides a computing device. The computing device may be, specifically, a desktop computer, a portable computer, a smartphone, a tablet computer, a personal digital assistant (PDA), etc. The computing device may include a CPU, a memory, an input/output device, etc. An input device may include a keyboard, a mouse, a touch screen, etc. An output device may include a display device, such as a liquid crystal display (LCD), a cathode ray tube (CRT), etc.

The memory may include the ROM and the RAM and provide a program instruction and data stored in the memory for the processor. In the embodiment of the present application, the memory may be configured to store a program of any method provided by the embodiment of the present application.

The processor, by calling the program instruction stored in the memory, is configured to execute any method provided by the embodiment of the present application according to the obtained program instruction.

An embodiment of the present application provides a computer storage medium, configured to store a computer program instruction used for the apparatus provided by the embodiment of the present application and containing a program for executing any method provided by the embodiments of the present application.

The computer storage medium may be any computer readable applicable medium or data storage device and includes but is not limited to a magnetic memory (for example, a floppy disk, a hard disk, a tape, a magneto-optical disk (MO), etc.), an optical memory (for example, CD, DVD, BD, high-definition versatile disc (HVD), etc.), and a semiconductor memory (for example, ROM, erasable programmable read-only memory (EPROM), electrically erasable programmable read only memory (EEPROM), a non-volatile memory (NAND FLASH), a solid state disk (SSD)), etc.

The method provided by the embodiments of the present application may be applied to a terminal device, or applied to a network device.

The terminal device may be also called UE, a mobile station (MS), a mobile terminal, etc. In one embodiment, the terminal may have capacity of communicating with one or more core networks via a RAN, for example, the terminal may be a mobile phone (or called "cellular" phone), or a mobile computer, etc., for example, the terminal may be also a portable, pocket, handheld, computer built-in or vehicle-mounted mobile apparatus.

The network device may be a base station (for example, an access point) and refer to a device communicating with a wireless terminal through one or a plurality of sectors on an air interface in an access network. A base station may be used for interconversion of a received air frame and IP grouping and serves as a router between the wireless terminal and other parts of the access network, and the other parts of the access network may include an IP network. The base station may also coordinate attribute management of the air interface. For example, the base station may be a base transceiver station (BTS) in GSM or CDMA, or a base station (NodeB) in WCDMA, or an evolutional base station (NodeB or eNB or e-NodeB) in LTE, or gNB in a 5G system, etc. The embodiment of the present application does not make a limitation.

A processing flow of the above method may be realized by a software program, the software program may be stored in a storage medium, and when the stored software program is called, steps of the above method are executed.

In conclusion, the embodiments of the present application includes the following.

In one embodiment, the single first UE or the plurality of first UEs (namely, reference UEs) simultaneously measure the downlink PRSs from the reference base station and the non-reference base station to obtain the first positioning measurement value (namely, the carrier phase measurement value), and further calculation is performed to obtain the first clock offset between the reference base station and the non-reference base station.

Then the first UE assists target UE to obtain the second clock offset by using three modes: mode 1, the single first UE directly uses the first clock offset as the second clock offset, and notifies the target UE via the Sidelink interface; mode 2, the plurality of first UEs of Type 2 (namely, the reference UEs of the second type) feed the first clock offsets back to the first UE of Type 1 (namely, the reference UE of the first type) via the Sidelink interface, the second clock offset is determined by the first UE of Type 1 based on the first clock offsets and the predefined criterion, and then the first UE of Type 1 notifies the second UE (namely, the target UE) of the second clock offset via the Sidelink interface; and mode 3, the plurality of first UEs notify the second UE of the first clock offsets via the Sidelink interface, and the second clock offset is determined by the second UE based on the first clock offsets and the predefined criterion.

Then the second UE modifies a first positioning measurement value based on the second clock offset to obtain a second positioning measurement value.

Finally, the second UE performs downlink positioning (a positioning solution based on the carrier phase) based on the second positioning measurement value after modifying.

The first UE (namely, the reference UE) may be common UE, or special UE for positioning, or a road test device. In mode 2, the first UE contains two types: the first UE of Type 1 (namely, the reference UE of the first type) and the first UE of Type 2 (namely, the reference UE of the second type). The PRS may be any downlink signal and include but is not limited to: a NR PRS, a NR C-PRS, a SSB and a CSI-RS, etc. The predefined criterion includes but is not limited to the arithmetic mean, selection of the first clock offset with an optimal channel condition value and the weighted mean.

Therefore, the embodiments of the present application provide the clock offset calibration solution between base stations based on the carrier phase and UE-based positioning. A problem that the positioning algorithm accuracy of an existing single-differential solution is limited by limited clock offset measurement accuracy of a PRS signal, so system positioning property is reduced is solved, for example: a maximum value of a clock offset between base stations in an existing TDD system is 50 ns or minus 50 ns, and after the above processing, a residual clock offset may be about 1 ns. Compared with a UE-assisted positioning solution, the present solution can effectively reduce time delay.

The embodiments of the present application may be provided as a method, a system, or a computer program product. Therefore, the present application may adopt a complete hardware embodiment, a complete software embodiment or a form of embodiment combining software and hardware. Besides, the present application may adopt a form of a computer program product implemented on one or more computer applicable storage media (including but not limited to a magnetic disk memory, an optical memory, etc.) containing a computer applicable program code.

The present application is described with reference to flowcharts and/or block diagrams of a method, a device (system), and a computer program product. It should be understood that each flow and/or block and a combination of flows and/or blocks in the flowcharts and/or the block diagrams can be realized by the computer program instructions. These computer program instructions can be provided to a general-purpose computer, a special-purpose computer, an embedded processor or processors of other programmable data processing devices to generate a machine, and an instruction executed by the computer or the processors of other programmable data processing devices generates an apparatus for realizing functions specified in one or more flows in the flowcharts and/or one or more blocks in the block diagrams.

These computer program instructions may be also stored in computer readable memory capable of guiding the computer or other programmable data processing devices to work in a specific mode, and the instruction stored in the computer readable memory generates a manufactured product including an instruction apparatus, and the instruction apparatus realizes the functions specified in one or more flows in the flowcharts and/or one or more blocks in the block diagrams.

These computer program instructions may be also loaded onto a computer or other programmable data processing devices, and the computer or other programmable devices can execute a series of operation steps to generate processing realized by the computer, so the instructions executed on the computer or other programmable devices provide steps for realizing the functions specified in one or more flows in the flowcharts and/or one or more blocks in the block diagrams.

What is claimed is:

1. A clock offset determination method, comprising:
   determining a first positioning measurement value by measuring downlink positioning reference signals (PRSs) from a reference base station and a non-reference base station;
   determining a first clock offset between the reference base station and the non-reference base station based on the first positioning measurement value; and
   assisting a target terminal to obtain a second clock offset based on the first clock offset.

2. The method according to claim 1, wherein the assisting the target terminal to obtain the second clock offset based on the first clock offset is in one of:
   mode 1, directly using the first clock offset as the second clock offset, and notifying the target terminal via a Sidelink interface;
   mode 2, feeding, via a sidelink interface, the first clock offset back to a first terminal of a first type, for determining the second clock offset based on the first clock offset and a predefined criterion and notifying the target terminal of the second clock offset via the Sidelink interface; and
   mode 3, notifying, via a Sidelink interface, the first clock offset to the target terminal, for determining the second clock offset based on the first clock offset and the predefined criterion.

3. The method according to claim 2, wherein the predefined criterion comprises one or a combination of: an arithmetic mean, selection of the first clock offset with an optimal channel condition value or a weighted mean.

4. The method according to claim 1, wherein the PRSs comprise one or a combination of:
   a new radio (NR) PRS, a NR carrier phase positioning reference signal (C-PRS), a synchronizing signal block (SSB) or a channel state indication reference signal (CSI-RS).

5. A clock offset determination method, comprising:
   determining a second clock offset, wherein the second clock offset is determined based on a first clock offset between a reference base station and a non-reference base station, and the first clock offset is determined based on a first positioning measurement value which is determined by a first terminal by measuring downlink positioning reference signals (PRSs) from the reference base station and the non-reference base station; and
   modifying the first positioning measurement value based on the second clock offset to obtain a second positioning measurement value.

6. The method according to claim 5, further comprising:
   performing downlink positioning based on the second positioning measurement value.

7. The method according to claim 5, wherein the second clock offset is determined in one of:
   mode 1, receiving the first clock offset notified by the first terminal via a Sidelink interface, and using the first clock offset as the second clock offset;
   mode 2, receiving the second clock offset notified by the first terminal of a first type via a Sidelink interface, wherein the second clock offset is determined by the first terminal of the first type based on the first clock offset and a predefined criterion, and the first clock offset is determined by the first terminal of a second type and fed back to the first terminal of the first type via the Sidelink interface; and mode 3, receiving first clock offsets notified by a plurality of first terminals via a Sidelink interface, and determining the second clock offset based on the first clock offsets and the predefined criterion.

8. The method according to claim 7, wherein the predefined criterion comprises one or a combination of: an arithmetic mean, selection of the first clock offset with an optimal channel condition value, or a weighted mean.

9. The method according to claim 5, wherein the PRSs comprise one or a combination of:

a new radio (NR) PRS, a NR carrier phase positioning reference signal (C-PRS), a synchronizing signal block (SSB) or a channel state indication reference signal (CSI-RS).

10. A terminal, comprising a processor and a memory;

wherein the memory is configured to store a program instruction; and the processor is configured to read the program instruction in the memory and execute the method according to claim 1.

11. The terminal according to claim 10, wherein the processor is configured to assist the target terminal to obtain the second clock offset based on the first clock offset in one of:

mode 1, directly using the first clock offset as the second clock offset, and notifying the target terminal via a Sidelink interface;

mode 2, feeding, via a sidelink interface, the first clock offset back to a first terminal of a first type, for determining the second clock offset based on the first clock offset and a predefined criterion and notifying the target terminal of the second clock offset via the Sidelink interface; and mode 3, notifying, via a Sidelink interface, the first clock offset to the target terminal, for determining the second clock offset based on the first clock offset and the predefined criterion.

12. The terminal according to claim 11, wherein the predefined criterion comprises one or a combination of: an arithmetic mean, selection of the first clock offset with an optimal channel condition value or a weighted mean.

13. The terminal according to claim 10, wherein the PRSs comprise one or a combination of:

a new radio (NR) PRS, a NR carrier phase positioning reference signal (C-PRS), a synchronizing signal block (SSB) or a channel state indication reference signal (CSI-RS).

14. A terminal, comprising a processor and a memory;

wherein the memory is configured to store a program instruction; and the processor is configured to read the program instruction in the memory and execute the method according to claim 5.

15. The terminal according to claim 14, wherein the processor is further configured to:

perform downlink positioning based on the second positioning measurement value.

16. The terminal according to claim 14, wherein the processor is configured to determine the second clock offset in one of:

mode 1, receiving the first clock offset notified by the first terminal via a Sidelink interface, and using the first clock offset as the second clock offset;

mode 2, receiving the second clock offset notified by the first terminal of a first type via a Sidelink interface, wherein the second clock offset is determined by the first terminal of the first type based on the first clock offset and a predefined criterion, and the first clock offset is determined by the first terminal of a second type and fed back to the first terminal of the first type via the Sidelink interface; and mode 3, receiving first clock offsets notified by a plurality of first terminals via a Sidelink interface, and determining the second clock offset based on the first clock offsets and the predefined criterion.

17. The terminal according to claim 16, wherein the predefined criterion comprises one or a combination of: an arithmetic mean, selection of the first clock offset with an optimal channel condition value, or a weighted mean.

18. The terminal according to claim 14, wherein the PRSs comprise one or a combination of:

a new radio (NR) PRS, a NR carrier phase positioning reference signal (C-PRS), a synchronizing signal block (SSB) or a channel state indication reference signal (CSI-RS).

19. A computer storage medium, wherein the computer storage medium stores a computer executable instruction which is configured to make a computer execute the method according to claim 1.

20. A computer storage medium, wherein the computer storage medium stores a computer executable instruction which is configured to make a computer execute the method according to claim 5.

* * * * *